United States Patent [19]

Guisti

[11] 4,142,367

[45] Mar. 6, 1979

[54] DOMESTIC WATER PRESSURE-FLOW POWERED GENERATOR SYSTEM

[75] Inventor: Vito Guisti, Walpole, Mass.

[73] Assignees: Eleanor A. Guisti Dondero, Norward; Robert E. Guisti, Walpole; George R. Guisti, Walpole; Richard P. Guisti, Walpole; Karlino Guisti, Walpole, all of Mass. ; part interest to each

[21] Appl. No.: 843,072

[22] Filed: Oct. 17, 1977

[51] Int. Cl.² ............................................. F15B 1/00
[52] U.S. Cl. ...................................... 60/325; 60/398; 60/DIG. 2; 290/54
[58] Field of Search ........... 60/325, 327, 398, DIG. 2; 61/19; 290/43, 54, 1 R; 418/255

[56] References Cited

U.S. PATENT DOCUMENTS

| | | | |
|---|---|---|---|
| 2,097,166 | 10/1937 | Stone | 219/303 |
| 2,491,352 | 12/1949 | Zeitlin | 418/255 X |
| 2,652,690 | 9/1953 | Labriola et al. | 60/398 X |
| 3,201,034 | 8/1965 | Ryffel | 418/255 |
| 3,205,969 | 9/1965 | Clark | 60/398 X |
| 3,512,072 | 5/1970 | Karazija et al. | 60/DIG. 2 |
| 3,986,354 | 10/1976 | Erb | 60/325 |

*Primary Examiner*—Edgar W. Geoghegan
*Attorney, Agent, or Firm*—Clarence A. O'Brien; Harvey B. Jacobson

[57] ABSTRACT

A fluid motor including a rotatable output shaft and a fluid inlet and a fluid outlet is provided for serial connection in a domestic water system supply pipe. A rotary electrical generator is also provided and the output shaft of the fluid motor is drivingly coupled to the generator. A bank of storage batteries is further provided and the generator includes a pair of electrical potential output conductors electrically connected to the bank of batteries through current regulating structure whereby the batteries may be recharged as a result of the fluid motor driving the generator. An auxiliary domestic electrical wiring system is provided and is electrically connected to the bank of storage batteries.

3 Claims, 2 Drawing Figures

DOMESTIC WATER PRESSURE-FLOW POWERED GENERATOR SYSTEM

BACKGROUND OF THE INVENTION

Domestic water systems are conventionally provided with water under approximately 70 pounds per square inch pressure and some portions of domestic water systems, disposed at low elevations, are supplied with water under pressure as high as 100 pounds per square inch. This reasonably high pressure delivery of water to domestic water systems is required in order that sufficient water pressure may be maintained at higher elevation portions of the system, but most domestic water users do not require the delivery of water at pressures approaching 70 to 100 pounds per square inch, with the possible exception of automatic water using appliances. However, automatic water using appliances may be modified to operate efficiently under considerably less water pressure.

In addition, there is presently great concern in this country for the conservation of energy and one means of reducing domestic energy consumption would be to find an economical and efficient way to utilize the excess pressure of water supplied to domestic water systems.

Various means of generating power from the pressure of domestic water systems have been heretofore provided and examples of such previously known structures are disclosed in U.S. Pat. Nos. 344,344, 1,774,603, 1,982,315, 2,097,166 and 2,436,683.

BRIEF DESCRIPTION OF THE INVENTION

The domestic water pressure-flow power generator system of the instant invention utilizes a sliding vane rotary motor serially connected in the supply pipe of a domestic water system and the motor is drivingly connected to an electrical generator for recharging a bank of storage batteries to which an auxiliary domestic wiring system is electrically connected. Each time water is drawn from the domestic water system, water is caused to pass through the supply pipe for the system and thus through the fluid motor serially connected therein. Operation of the fluid motor results, whereby the electrical generator is driven and supplies electrical current to the bank of batteries of the auxiliary domestic electrical wiring system for the purpose of recharging the batteries. Although large amounts of electrical power may not be generated as a result of the instant invention without excessive use of domestic water, over the period of a month in homes where perhaps as much as 30,000 gallons of water is used, considerable electrical protential may be generated and stored in the bank of batteries for use in supplying current to various domestic electrical appliances throughout the month.

The main object of this invention is to provide a power generating system to be driven by the flow of water under pressure through a domestic water system.

Another object of this invention is to provide a power generating system including an electrical generator for recharging a bank of storage batteries to which an auxiliary domestic electrical wiring system is electrically connected.

Yet another object of this invention is to provide a power generating system which may be readily operatively connected to existing domestic water systems as well as incorporated in newly constructed domestic water systems.

A final object of this invention to be specifically enumerated herein is to provide a power generating system in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numberals refer to like parts throughout.

DETAILED DESCRIPTION OF THE INVENTION

Figure 1:
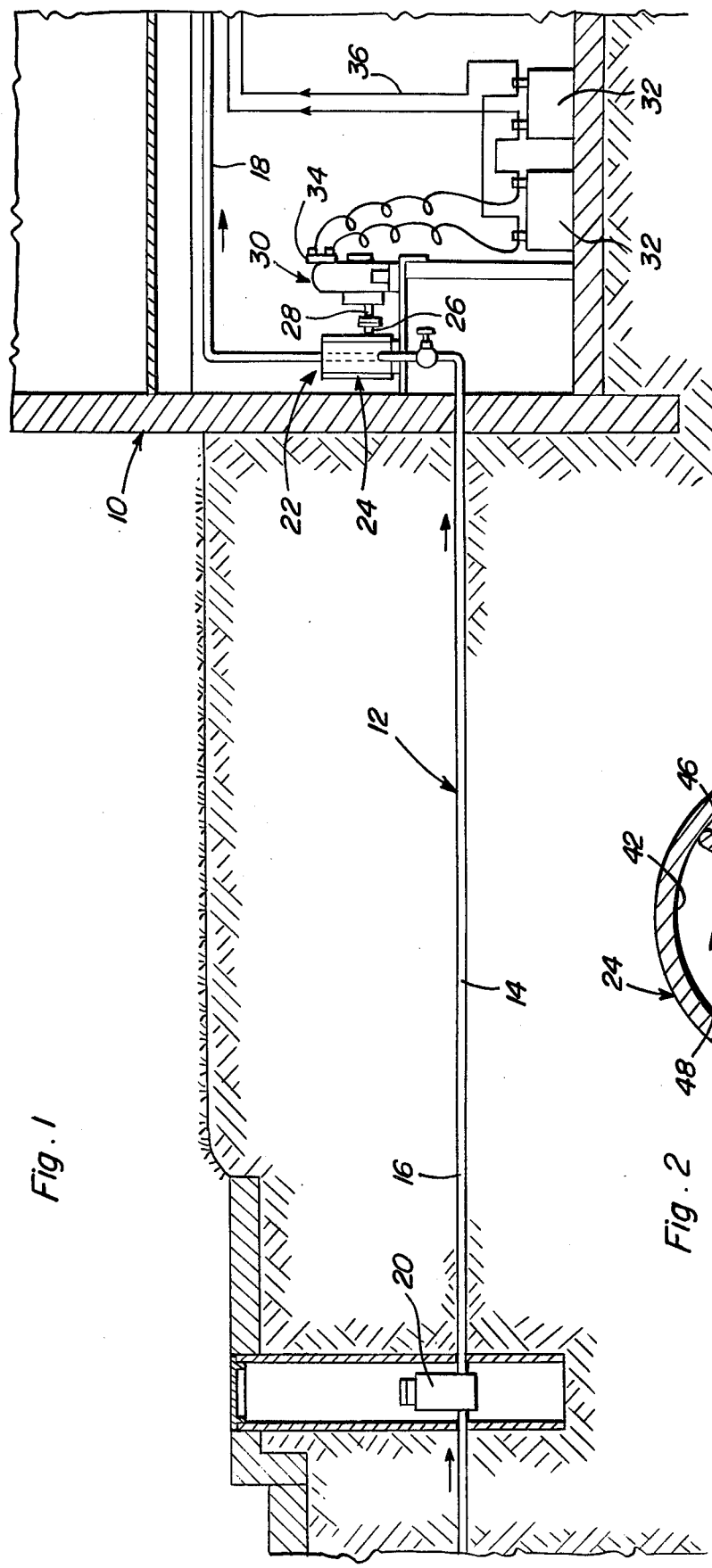
FIG. 1 is a sectional view, fragmentarily illustrating a conventional domestic water supply system and with the power generating system of the instant invention operatively associated with the water supply system.

Referring now more specifically to the drawings, the numeral 10 generally designates a building to which water under pressure is supplied by a domestic water system referred to in general by the reference numeral 12. The domestic water system includes a supply pipe 14 including an inlet end portion 16 and an outlet portion 18 within the building 10. The inlet end portion 16 has a water meter 20 serially connected therein and the outlet end 18 is connected to the water supply system (not shown) within the building 10.

The power generating system of the instant invention is referred to in general by the reference numeral 22 and includes a fluid motor referred to in general by the reference numeral 24 serially connected in the supply pipe 14 between the inlet and outlet end portions 16 and 18 thereof.

The rotary motor 24 includes an output shaft 26 drivingly coupled to the input shaft 28 of an electrical generator 30 and the electrical generator is connected to a bank of storage batteries 32 through a current regulator 34, whereby the current supplied from the generator 30 to the batteries 32 through the current regulator 34 may be utilized to recharge the batteries 32.

The building 10 includes an auxiliary domestic electrical wiring system 36 electrically connected to the batteries 32 and which may be utilized to provide auxiliary power to various domestic electrical appliances (not shown).

Figure 2:
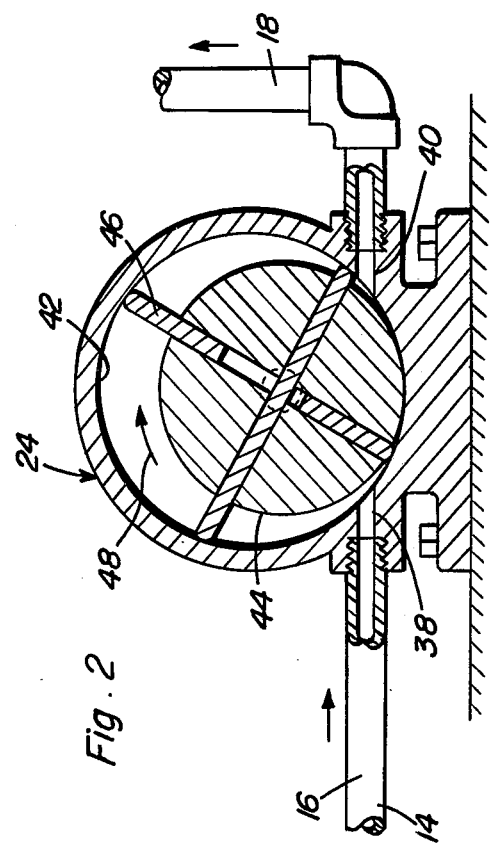
FIG. 2 is an enlarged, fragmentary, vertical sectional view taken substantially upon a plane passing through the fluid motor of the power generating system.

With attention now invited more specifically to FIG. 2 of the drawings, it may be seen that the fluid motor 24 includes a water inlet 38 to which the inlet end portion 16 of the pipe 14 is connected and an outlet 40 to which the outlet end portion 18 of the pipe 14 is connected. The motor 24 defines a cylindrical cavity 42 in which an eccentric rotor 44 equipped with radially sliding vanes 46 is journaled. Accordingly, it may be seen that upon the passage of water through the fluid motor 24 in the direction indicated by the arrow 48, the rotor 44 will be caused to rotate in the same direction. Therefore, movement of the water through the motor 24 will cause the output shaft 26 thereof to drive the input shaft 28 of the generator 30 and the latter to supply current to the batteries 32 through the regulator 34 for the purpose of recharging the batteries 32.

At any time water is drawn from the domestic water system 12 in the interior of the building 10, water will be caused to flow through the fluid motor 24 and current to be generated by the generator 34 recharging the batteries 32. Of course, the auxiliary domestic electrical wiring system 36 may be utilized intermittently to provide electrical power to various domestic electrical appliances. As current is drawn from the batteries 32 by the auxiliary wiring system 36 to power domestic electrical appliances, the batteries 32 gradually will be discharged. However, each time water is drawn from the domestic water supply system 12, the generator 30 will be actuated to supply current to the batteries 32 through the regulator 34 in order to recharge the batteries 32.

It is pointed out that fluid motors other than the type illustrated at 24 may be utilized to power the generator 30. Further, the domestic water supply system within the building 10 may have various automatic water using appliances modified to operate efficiently on reduced water pressures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as set forth in the claims which follow.

What is claimed as new is as follows:

1. In combination with a building including a battery powered auxiliary electrical wiring system and a pressurized domestic water system including a supply pipe having an inlet end portion communicated with a source of water under pressure exteriorly of said building and an outlet end portion connected to various domestic water outlets within said building, a power generating system including a fluid motor having a rotatable output shaft and a fluid inlet and a fluid outlet, said fluid motor being disposed within said building and serially connected in said supply pipe with said inlet communicated with said inlet end portion and said outlet communicated with said outlet end portion, whereby each discharge of water from one of the said various outlets will cause water to flow through said motor and said outlet shaft to be rotated, an electric generator provided with a rotary input shaft, said output shaft being drivingly connected to said input shaft, a bank of storage batteries, said generator including a pair of electrical potential output conductors electrically connected to said bank of batteries for recharging the same, current regulating means, said electrical output conductors being electrically connected to said bank of batteries through said current regulating means, said auxiliary domestic electrical wiring system electrically connected to said bank of storage batteries.

2. The combination of claim 1, wherein said fluid motor comprises a sliding vane rotary fluid motor.

3. The combination of claim 1, including a cutoff valve serially connected in said inlet end portion of said supply pipe upstream from said motor.

* * * * *